UNITED STATES PATENT OFFICE 2,405,423

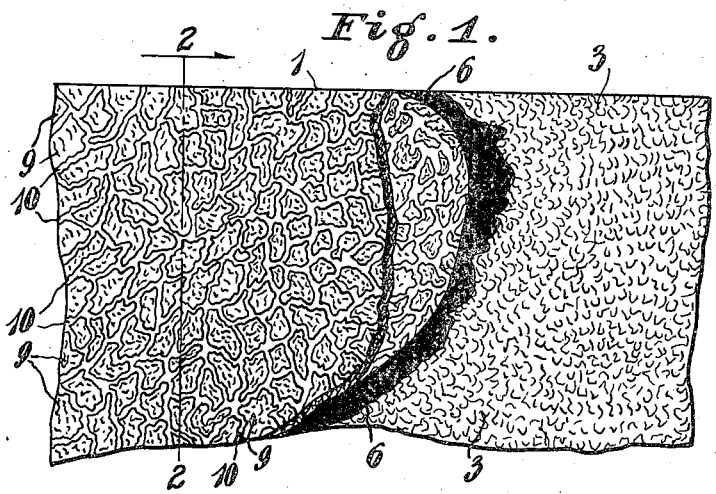
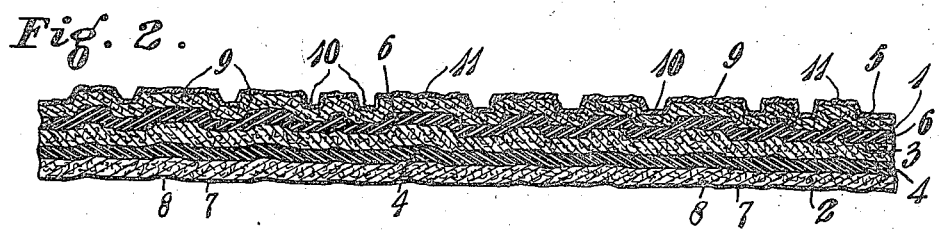
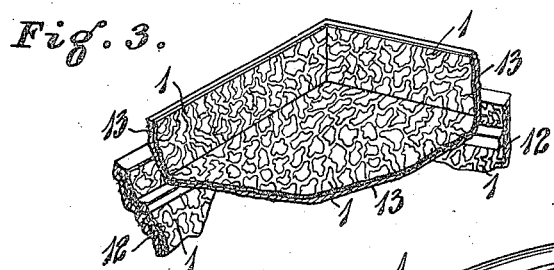
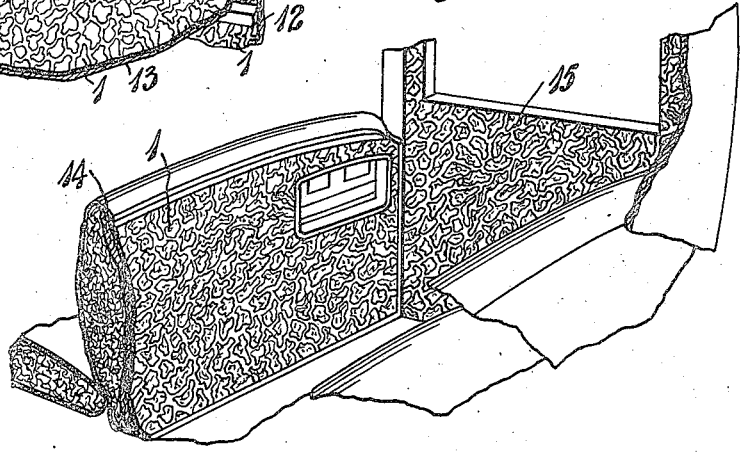

COMPOSITION PANEL BOARD

William F. Hayes, Detroit, Mich.

Application July 31, 1940, Serial No. 348,875

3 Claims. (Cl. 154—44)

This invention relates to a novel and improved laminated fiber board, and particularly pertains to fiber board provided with a decorative face and having thermal insulating as well as sound deadening qualities. The laminations are adhered with waterproof adhesive material, thereby sealing the board against penetration of water and moisture into the interior structure between the exposed facing sheets. The face of one exposed lamination may be embossed with elevations and depressions or otherwise treated to provide a finished decorative face, and the rough texture of the decorative lamination is preferably carried through its thickness to the underside surface so that the adhesive therebeneath employed for securing the decorative lamination may fill the depressions and thereby preserve the elevations and depressions in the exposed side of the finishing lamination. The finishing sheet may be painted on its exposed face in addition to the embossments. The outer layer on the side opposite to the finish layer is of the character of felt and unsaturated to provide for insulation. It is preferably indented to give increased qualities of insulation. The core sheet or sheets are felt coated with bituminous or other suitable waterproof adhesives. The adhesive coating next to the indented felt which is on the face opposite to the decorative finished sheet also preferably fills the depressions, if the felt be indented, to preserve the indented structure.

The invention is generally typified by a laminated or composite structure comprising an embossed finishing sheet of thin tough fibrous material, such as kraft paper, and two or more foundation sheets. The foundation sheets are cellular and porous to provide for thermal insulation, and the undermost foundation sheet which is the exposed face opposite to the finish layer may be indented. The core foundation sheet or sheets between the facing sheets are saturated and coated with a hardening waterproof adhesive to render them substantially rigid and give a board-like character to the composite laminated structure. While the composite laminated structure is substantially rigid and board-like, it is sufficiently flexible to be bent around corners and applied to cover rounded surfaces.

For a better understanding of the invention reference may be made to the accompanying drawing in which:

Fig. 1 is a face view of a portion of a laminated sheet, embodying the invention, having part of the decorative embossed sheet turned back from the adjacent base sheet and showing the adhesive;

Fig. 2 is an enlarged cross-sectional view on line 2—2 of Fig. 1;

Fig. 3 is a fragmentary perspective view of a trunk structure and its till showing a laminated structure, embodying the invention, lining the trunk and its till; and Fig. 4 is a fragmentary perspective view of a motor vehicle body, showing a laminated structure, embodying the invention, covering the back of the seat.

Referring to the drawing in which like numerals are used to designate like parts, numeral 1 is a laminated fiber board composed of base sheets 2 and 3 adhered by a hardened waterproof coating 4, such as asphalt or the like, and a decorative facing sheet 5 adhered to one of the base sheets by a hardened waterproof coating 6.

The base sheet 3 is preferably cellular and porous, typified by some such material as felt or loosely felted paper which is used as foundations in the manufacture of bituminized paper, fabrics, asphalt roofing, and the like. It may be of any desired thickness. Being cellular and porous it may be saturated with a hardening waterproof adhesive or left unsaturated to provide for insulation but in either event builds up a laminated composite structure of greater thickness with no increase in weight over a more densely felted sheet when sandwiched between facing sheets 2 and 5. The hardening saturant or coating waterproofing adhesive provides for a substantial rigidity to make the composite laminated sheet more or less board-like in character although being sufficiently flexible to be bent in applying same around curved surfaces which are to be covered. The exposed foundation sheet 2 may be indented to provide elevations 7 and depressions 8. The elevations in one side of the sheet are opposite to the depressions in the other side of the sheet, and the elevations and depressions are formed in the sheet while same is being molded so that they are permanent and will not be pressed back in place.

Sheet 5 is of the character of a thin tough paper, such as kraft, and is advantageously provided with separate small elevations 9 and depressions 10 generally referred to as indentations. The indentations in one side are opposite to the elevations on the other side, and are molded in the sheet at the time it is formed on the felting machine.

A finishing material 11, such as Pyroxlyn or the like, can be applied to the exposed face of the embossed sheet. The Pyroxlyn not only provides a finished decorative side but protects the sheet against scuffing or roughening of the fibers. The coating is applied in a thin layer, conforming with the irregular surface texture of the indentations and elevations, and is relatively hard. If the sheet 3 be saturated it is preferably saturated with a relatively hard saturant to rigidify the sheet.

The rough texture of the facing sheet preferably carries through its thickness to its undersurface, and the coating 6 employed to adhere the finish sheet is applied to conform to its undersurface and fill the indentations in order to permanently retain the indentations and elevations in the finishing sheet and prevent them from collapsing when the board is being handled or is in use.

The composite laminated structure above described is adapted for many and various uses wherever wood, leather, composition board, and other finishing materials are used. It is particularly adapted for lining the walls 12 of a trunk or the tills 13 thereof, covering the backs of the front seats 14 of motor vehicles or the interior walls 15 of automobiles, particularly taxis. So, too, the composite board is suitable for lining the trunk compartments, the dash, cab compartments and the like in passenger and truck motor vehicles.

One or more of the sheets 3 may be included between the decorative finishing layer 5 and the other foundation layer 2. The sheet or sheets 3 being coated on both sides with a relatively hard adhesive render same substantially rigid and board like, and even more so if also saturated with a relatively hard adhesive. A light weight, yet rigid, board is obtained.

If sheet 2 is indented, it can be more dense and compact as the indentations would provide the sound and heat insulating character. If not indented, the sheet is more loosely felted to provide numerous cells or pores throughout the felt structure.

The composite structure is substantially rigid, combines therein sound and heat absorbing qualities. The saturated sheet to some extent absorbs heat, but not to the extent of the loosely felted or indented sheet. The fact, however, that the saturated sheet is alternately laid with an unsaturated sheet functions to break up the transmission of sound and prevents rumbling and vibration.

While one embodiment has been described in detail for showing a representative composition board and some suggested uses, it is understood that there may be various changes without departing from the spirit of the invention.

I claim:

1. A composite fiber board comprising a plurality of loosely felted fibrous sheets, including at least one sheet which is saturated and at least one sheet which is not saturated with hardened thermoplastic waterproofing material, adhered in superposed relation with a relatively hard thermoplastic adhesive material, and a facing sheet adhered to an impregnated loosely felted sheet by a relatively hard thermoplastic adhesive material, said hard adhesive material associated with the sheets rendering the laminated structure board-like in character.

2. A composite fiber board comprising a plurality of loosely felted fibrous sheets adhered in superposed relation with a relatively hard thermoplastic adhesive material, one or more of which sheets are and one or more of which sheets are not saturated with a hard thermoplastic adhesive material, and a facing sheet adhered to one of the saturated loosely felted sheets by a relatively hard thermoplastic adhesive material.

3. A composite fiber board comprising a plurality of loosely felted fibrous sheets, including at least one sheet which is saturated and one sheet which is not saturated with hardened thermoplastic waterproofing material, adhered in superposed relation with a relatively hard thermoplastic adhesive material, and an indented facing sheet adhered to one of the loosely felted sheets by a relatively hard thermoplastic adhesive material, said adhesive adjacent the indented sheet filling the indentations on the underside of the indented sheet to a level above the elevations between said indentations, thereby serving to preserve the indentations on the exposed side of the facing sheet.

WILLIAM F. HAYES.